United States Patent Office 3,266,885
Patented August 16, 1966

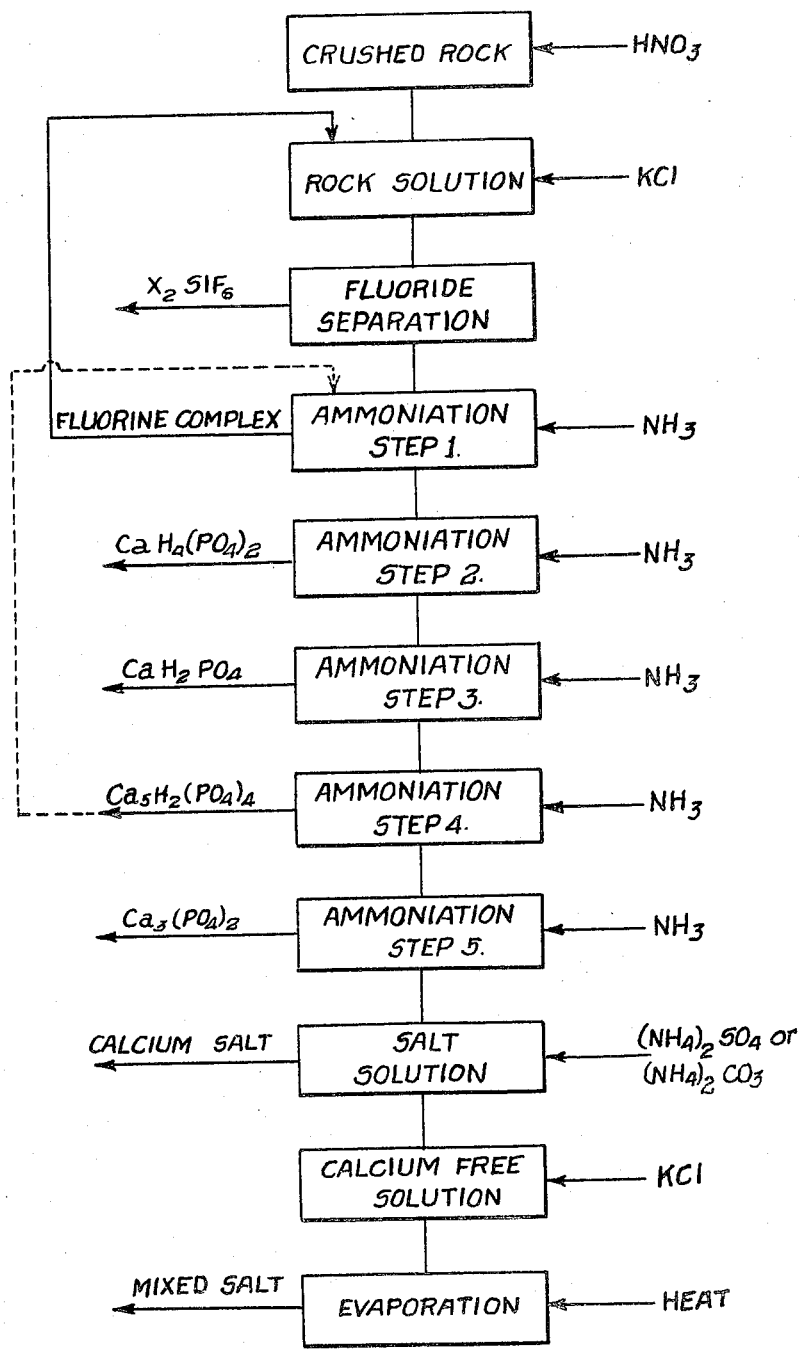

3,266,885
METHOD OF RECOVERING PHOSPHATIC VALUES FROM PHOSPHATE ROCK
Paul Caldwell, 9414 Clifton Park Ave., Evergreen Park, Ill.
Filed Apr. 23, 1963, Ser. No. 275,150
16 Claims. (Cl. 71—39)

The invention is directed to new and improved methods of recovering phosphatic values from phosphate rock basically utilizing nitrogenous or equivalent acid digestion of the rock. More specifically, the invention is directed to a method of improved versatility and economy for use in the acid treatment of phosphate rock, the method being capable of forming selected calcium phosphates, and particularly dicalcium phosphate of unique purity, as well as other valuable salts for use in both fertilizer and feed formulations.

The fertilizer, plant food and animal feed producers continue to basically rely on a supply of calcium phosphates recovered from phosphate rock utilizing the well known sulfuric acid digestion methods. In my earlier Patents 2,683,075, 2,778,712 and 2,942,967 I have dealt generally with some of the basic disadvantages inherent in sulfuric acid digestion procedures and certain improvements obtained by substituting for sulfuric acid a nitrogenous or equivalent acid, such as hydrochloric acid, to carry out phosphate rock digestion based on concurrent nitrogen nitrate value recovery. Among the disadvantages present with the use of sulfuric acid digestion is the relatively low purity of the phosphoric acid solution. It has been found that high dilution is necessary for relatively efficient phosphatic value recovery thus increasing the cost of the digestion procedures. Phosphorous recovery on the order of 90% is considered excellent and 70% recovery is not too rare. Most of the fluorine content is in solution and considerable amounts of the calcium are dissolved.

On the other hand, there are good reasons why these industries prefer to pay the additional cost inherent in sulfuric acid digestion procedures as the use of nitric acid has been accompanied by certain drawbacks. Fluorine content control is and always has been a basic problem. Prior to my earlier discoveries, the use of nitric acid resulted in about only 80% recovery of the phosphatic values. Accordingly, substitution of nitric acid for sulfuric acid did not afford any particular advantages.

My earlier work set forth in Patents 2,683,075 and 2,778,712 made higher phosphatic value recovery possible and improved fluorine content removal to an extent that nitric acid digestion could be successfuly used in the recovery of calcium phosphates and mixed salts for fertilizer and plant food formulation. Phosphatic value recovery was improved to the order of over 95%. The use of potassium chloride or other equivalent reactants to form the precipitate potassium silico fluoride reduced fluorine content in a relatively simple and economical manner to 20% or somewhat less. Although the potassium silico fluoride is a desirable by-product and the resultant calcium phosphates are highly desirable for fertilizer use, the residual fluorine content still does not meet the minimum requirements specified by the feed industry.

My subsequent Patent 2,942,967 among other things is directed to the control and recovery of calcium and nitrate values with the completely soluble calcium nitrate being converted to calcium chloride. Under such circumstances the available phosphorous is recovered almost completely in the form of pentacalcium phosphate. Additionally, the water solubility of the calcium phosphate product was improved to reach the rather large market demand for a more soluble phosphate fertilizer.

Thus the improvements in nitrogenous acid digestion have been effective primarily in recovering and treating all useful values basically for fertilizer and plant food use. A consistent limitation resides in the failure to adequately reduce fluorine content in the ultimate product to permit acceptance of the product for feed formulation. Another disadvantage resides in the absence of adequate control for the selective recovery of specific calcium phosphates of the mono-, di-, and tri- forms. In this respect dicalcium phosphate is preferred for feed use in view of its ready assimilation. Monocalcium phosphate is highly desirable for fertilizer use because of its high water solubility. A completely successful process must provide adequate control for substantially complete recovery of all of the phosphatic values and permit formation and recovery of selected forms of calcium phosphates which can be channeled to different industries for fertilizer, plant food and animal feed use.

It is an object of the invention to provide new and improved methods for recovering phosphatic values from phosphate rock using nitrogenous or equivalent acid digestion, the methods involving selected and controlled ammoniation of a nature and extent providing for recovery of selected high purity calcium phosphate products.

A further object is to provide new and improved methods of recovering phosphatic values from phosphate rock utilizing selected ammoniation of nitrogenous acid solutions of the rock for the controlled removal of fluorine content to an extent that the ultimate recovered calcium phosphate products are acceptable for use in the formulation of animal feeds.

Another object is to provide a new and improved method of recovering high purity and readily separable dicalcium phosphate from phosphate rock utilizing nitrogenous or equivalent acid digestion of the rock.

Other objects not specifically set forth will become apparent from the following detailed description of the invention made in conjunction with the accompanying drawing which diagrammatically illustrates in flow sheet form the basic and alternate treatment step forming a part of the invention.

In general, the discoveries of the present invention reside in the use of an appropriate potassium salt capable of being active in the forming of an insoluble and relatively pure silico fluoride in an acid medium, such potassium salt including potassium nitrate and potassium chloride for example, in the treatment of a fresh nitrogenous acid solution of phosphate rock to remove a substantial part of the fluorine in the form of potassium silico fluoride, any substantial excess of the potassium salt reagent being avoided. Subsequent to the basic fluoride by-product removal, the acid solution is then selectively and controllably ammoniated to obtain segregated and distinctly precipitated calcium phosphate products which are selectively and uniquely suitable for use either in fertilizer or animal feed formulation. Residual calcium and nitrogen values can be readily recovered in the form of segregated or mixed salts, the special and unique fluorine content removal and ammoniation procedures not interfering with this basic economic necessity in efficient utilization of nitric acid digestion procedures. In carrying out these special treatments, new fluorine complexes and intermediate hydro-phosphate materials have been discovered and isolated. In the preferred form of the invention, the separation and removal of these new complexes and hydro-phosphates provides for a substantial recovery of commercially important dicalcium phosphate in substantially improved condition particularly adapting the same for utilization in animal feed preparations. Another important aspect of the invention resides in the existence of exceptional versatility in the respect that certain selected valuable precipitates can be either individually removed for marketing or readily recycled within the treatment system for specified value recovery. In this respect certain precipitates can actually be converted through recycling into the ultimate final products desired.

Referring to the accompanying drawing, any suitable phosphorous-containing rock is ground to the desired degree for efficient digestion during the acid treatment. In this respect satisfactory results can be obtained with rock ground to a fineness such that 80 to 90% of the same will pass through a 60 mesh screen (Tyler standard). The rock may also be calcined prior to digestion in order to char organic matter and carbonates present therein. Such charring will reduce foaming developed during the digestion operation. If calcination is used, the temperature of this particular step should be maintained below that at which lime and silica present in the rock combine to form calcium silicate which interferes with the filtration operation during digestion of the rock.

The crushed or ground rock may be acid treated in continuous or batch-type methods depending upon the equipment available. If a batch digestion procedure is followed, a super saturation of rock is preferably provided by using 50% excess rock in a given amount of acid to make full use of the hydrogen ion made available by the acid. Additional acid can then be added to place in solution all of the phosphatic value of the rock followed by removal of the insoluble material by decantation or use of other suitable separation procedures. Additional rock is then added to again fully utilize the available hydrogen ions of the acid and the batch operation is continued until full utilization of the nitric acid is obtained. Upon the obtaining of an acid solution including the solubilized rock components therein which consist primarily of phosphorous, calcium and fluorine components, the acid solution is centrifuged as, for example, in an imperforate basket-type centrifuge to remove at least substantially all of the entrained insoluble matter such as clay. The acid solution is then made perfectly clear by use of a polishing filter of known type.

The digesting agents used in the practice of the present invention comprise inorganic nitrogenous acids such as nitric acid or acid mixtures obtained by the passage of gaseous nitrogen oxides through an aqueous medium. The nitrogenous acid agent may comprise nitric acid obtained from a commercial source or may comprise nitrogenous acids produced at the site of the digestion operation. The nitrogenous digestion agent in concentration may range from dilute to highly concentrated forms, the dilute solutions requiring more prolonged digestion periods than the concentrated solutions. The use of the digestion agent, such as nitric acid, can be varied considerably and temperature control of the digestion reaction will depend on the concentration of acid used and the speed of reaction desired. While the nitric acid will generally be more expensive than the phosphate rock, it is preferable to obtain a balance between the degree of utilization of acid and the degree of recovery of the phosphatic components of the rock. The balance is determined upon economic grounds, the residual unused portions of rock and acid being subsequently utilized with fresh charges for further recovery of the important components thereof.

A suitable potassium salt such as potassium chloride and potassium nitrate is then added to the rock solution and it is necessary to use approximately just enough potassium salt to convert a substantial part of the fluorine content to potassium silico fluoride while avoiding an increased salt concentration. Any substantially increased salt concentration makes ultimate filtering and washing difficult with regard to the selected phosphate products obtained from stepwise ammoniation. Furthermore, it has been found that the use of an excess of potassium salt can result in impure silico fluoride formation in the form of mixed salts which reduces the value of the potassium silico fluoride as a by-product. Thus the adding of excess potassium salt not only interferes with subsequent product removal, but also limits the adaptability and versatility of nitrogenous acid digestion procedures.

For the use of a calcium phosphate such as dicalcium phosphate in the formulation of animal feed, the fluorine to phosphorous ratio should preferably be no more than 1 to 100 parts by weight. The potassium silico fluoride precipitate removed during the aforementioned separation step of the process accounts for substantially all of the fluorine content except for a residual content on the order of 0.5 to 0.8%. This residual content as compared to the ultimate phosphate product containing approximately 48% phosphate provides for a ratio which exceeds the minimum requirements of the feed industry. It has been found that controlled relatively nominal ammoniation of the remaining acid solution results in the precipitation of a gelatinous or waxy complex which is identified as calcium-iron-phosphate-fluoride containing a significant part if not substantially all of the residual fluorine. This complex can be readily removed by filtering or the like and the residual fluorine content of the acid solution is reduced to a nominal and acceptable amount such as on the order of 0.05%.

In carrying out this particular part of the procedure which constitutes the ammoniation step 1, ammonia is added to the acid solution to an extent that the complex precipitate is formed, ammoniation being discontinued as the precipitate being formed begins to become more crystalline. In this respect there is a marked observable demarcation occurring during ammoniation which clearly identifies termination of the precipitation of the complex and commencing of the precipitation of a crystalline, basically calcium phosphate product.

Another indication of the extent of ammoniation necessary for complex formation may reside in pH control of the acid solution. Depending upon the degree of dilution of the solution, it has been found that ammoniation to a pH of less than about 1, such as a pH of 0.95, is adequate to form the complex to an extent that residual fluorine content is reduced within feed requirements. The complex may contain at least about 60% of the total residual fluorine thus providing for a very substantial percentagewise reduction. Removal of this complex can materially improve subsequent crystalline calcium phosphate product separation not only from the standpoint of improved purity but also with regard to mechanical separation thereof. The fluoride precipitate as well as the fluorine complex is marketable with regard to the fluorine content thereof. This content can be increased by recycling the complex as indicated in the accompanying drawing to the potassium chloride treatment step of the process. In this respect it has been found that a ton of phosphate rock might produce 118 pounds of potassium silico fluoride as a useful by-product, and that this amount can be increased by an additional 2.6 pounds if the complex is recycled as indicated. The calcium-iron-phosphate-fluoride complex is completely soluble in neutral ammonium citrate thus providing available iron for fertilizer and plant food use. The iron content can be on the order of 50% by weight (calculated as ferric oxide) depending on the particular source of phosphate rock. By comparison, fertilizer and plant food iron supplying compositions, such as iron chelates, are much more expensive than the complex obtained from this method.

Following fluorine complex removal, ammoniation step 2 may be carried out to form a phosphate precipitate which is identified on the accompanying drawing as monocalcium phosphate. Strictly speaking, the particular phosphate product is not a true monocalcium phosphate but is more aptly termed a calcium hydro-phosphate. The precipitate formed exhibits relatively small granular crystal structure and may contain, for example, 18.7% total phosphate and 15.6% water soluble phosphate. Thus the precipitate is about 83.4% water soluble with this portion possibly being considered monocalcium phosphate, the remainder presumably constituting an iron complex which is citrate soluble. The calcium hydro-phosphate precipitate has been found to include a ratio of calcium oxide to phosphate of about 0.735 while the ratio for a true monocalcium phosphate is normally on the order of 0.3952. By comparison to a true dicalcium phosphate having a ratio of 0.790, it can be said that the calcium hydro-phosphate obtained approaches dicalcium phosphate but is less basic.

Depending upon the degree of dilution of the acid solution, the pH for precipitation of the calcium hydro-phosphate during ammoniation step 2 may be on the order of 2 or less. Under normal operating conditions the pH to which the acid solution is raised during ammoniation step 2 will be greater than about 1. Practically, the pH will normally be on the order of 1.75 for adequate precipitation of the calcium hydro-phosphate product. This precipitate is highly desirable for fertilizer and plant food use and constitutes a valuable product of the method. Furthermore, its removal is important with regard to the ultimate obtaining of a high purity, readily separable dicalcium phosphate which constitutes the most important product of the method.

Ammoniation step 1 intended for calcium-iron-phosphate-fluoride complex formation can be deleted from the method if desired. In this respect the acid solution following basic fluoride separation can be ammoniated continuously to an extent that the calcium hydro-phosphate precipitate is completely formed, the ammoniation not being terminated for complex removal. The resultant by-product will still basically consist of calcium hydro-phosphate but of course will include a higher fluorine content. In following this procedure the subsequently formed calcium phosphates, including the primary dicalcium phosphate product, will still exhibit adequately minimal fluorine content.

Ammoniation step 3 is carried out for the purpose of producing the basically important dicalcium phosphate product. During the terminal portion of the ammoniation occurring during step 2 there is a marked change in the appearance of the precipitate being formed. This change indicates the completion of the precipitation of the calcium hydro-phosphate and the beginning of the precipitation of the highly desirable dicalcium phosphate. Ammoniation during step 3 continues to a pH of about 3, depending upon the dilution of the acid solution, and a very crystalline and readily settling and filtered dicalcium phosphate precipitate is formed. This product exhibits a calcium oxide to phosphate ratio on the order of 0.799 which basically exactly conforms with a true dicalcium phosphate ratio of 0.790. These ratios are based on actual percentage ratios and not mole ratios. By way of example, the dicalcium phosphate may contain 52.15% phosphate indicating that it is an anhydrous dicalcium phosphate, this having been confirmed by biological assay. The precipitate contains approximately 18.3% of the total phosphorous, as little as 0.02% fluorine, and 4.9% of the phosphate is water soluble. The product is completely citrate soluble.

If desired, ammoniation can then proceed as indicated in step 4 of the accompanying drawing to form pentacalcium phosphate. This pentacalcium phosphate if desired can be recycled to the ammoniation step 1 to improve selected phosphate value recovery in the method. The demarcation between the dicalcium phosphate and pentacalcium phosphate during ammoniation is marked as there is a sharp break in precipitation at the end of the dicalcium phosphate ammoniation step. The next occurring precipitate becomes much less crystalline and is more difficult to filter. The pentacalcium phosphate by-product formation will be normally completed at a pH of about 6 depending upon the degree of dilution of the acid solution. The pentacalcium phosphate formed may contain 48.75% phosphate with 16.6% of the total phosphorous being present, and 4.7% of it being water soluble and all of it being citrate soluble. The pentacalcium phosphate is completely available for use as a fertilizer without the burning effects of the more acid phosphates. In this respect it is more similar to bone meal.

Ammoniation step 5 results in the forming of tricalcium phosphate which may be particularly useful in the preparation of fertilizers and plant food. The removal of tricalcium phosphate is optional depending upon the form of phosphatic value recovery desired. The tricalcium phosphate may be retained in solution for subsequent by-product salt preparation. In the forming of the tricalcium phosphate by-product, elimination of pentacalcium phosphate by-product can increase the tricalcium phosphate recovery. Ammoniation in step 5 may be carried out to a pH of about 7 depending upon the degree of dilution. Substantial control over the recovery of pentacalcium or tricalcium phosphates is available in view of the presence of an excess of calcium in the remaining solution and this feature recognized in this invention adds to the greater versatility of the method.

Following phosphorous recovery, the remaining salt solution may be readily treated for calcium and nitrogen value recovery. As indicated on the accompanying drawing, ammonium sulphate or ammonium carbonate may be added to the salt solution to precipitate an appropriate calcium sulphate or carbonate. If calcium sulphate is formed it can be ultimately treated with ammonium carbonate to convert all of the residual calcium salts to chalk (calcium carbonate) as a by-product. The subsequent calcium free solution is then preferably treated with potassium chloride to convert all of the nitrate nitrogen to potassium nitrate. The solution of potassium nitrate and ammonium chloride is then evaporated to a boiling point of 114° C., then cooled to 30° C., and the resulting crystals removed by centrifugal filtering. The salt crystals thus formed are about 96% pure potassium nitrate containing about 29.2% of the nitrate nitrogen. The remainder of the mixed salts may be evaporated and crystallized as a mixture of about equal parts of potassium nitrate and ammonium chloride. In this manner all of the basic values of the phosphate rock, potassium chloride, nitric acid and ammonia are recovered in useful forms.

The following are examples of certain preferred aspects of the method described above. It is not intended that these examples should be construed as limiting the scope of the invention.

*Example I*

Approximately 1000 pounds of carbonized Florida rock containing 360 pounds phosphate and 500 pounds calcium oxide was dissolved in nitric acid by the counter-current leach procedure and the solution clarified. With the solution at 70° C., 150 pounds of potassium chloride was added and the solution cooled to 30° C. A potassium silico fluoride precipitate weighing approximately 55.1 pounds was removed by centrifugal filtering and was washed and dried. The filtrate was then ammoniated to a pH of 0.95 and 23.9 pounds of calcium-iron-phosphate-fluoride complex was removed. This precipitate after washing and drying contained 22.6% phosphate and 10.19% calcium oxide with 2.96% fluorine. Of the phosphate of this complex 38.0% was water soluble. The remaining filtrate was then further ammoniated to a pH of 2 and 458 pounds of resulting precipitate removed, this precipitate constituting the calcium hydro-phosphate basically similar to monocalcium phosphate. After washing and drying the precipitate was found to contain 50.0% phosphate and 36.56% calcium oxide. Of the phosphate 29.6% was water soluble. The remaining filtrate was then further ammoniated to a pH of 3 and 211 pounds of resulting precipitate removed. This precipitate was dicalcium phosphate and after washing and drying was found to contain 52.16% phosphate and 41.2% calcium oxide with 0.02% fluorine. Of this product 4.9% of the phosphate was water soluble. The remaining filtrate was further ammoniated to a pH of 6 and 32 pounds of precipitate removed. This precipitate was pentacalcium phosphate and after washing and drying was found to contain 48.75% phosphate and 48.1% calcium oxide. Of this product 4.7% of the phosphate was water soluble. All of the foregoing phosphate cuts were citrate soluble. The remaining filtrate was further ammoniated to a pH of 7 and approximately 1 pound of product removed which after washing and drying contained 45.75% phosphate and 54.2% calcium oxide. This product was tricalcium phosphate and was almost completely insoluble in water or ammonium citrate. The remaining filtrate was then weighed and analyzed for calcium oxide and found to contain 227.3 pounds. To the solution was added 397.6 pounds of sulfuric acid (77.6%) and ammonia to maintain a pH of 6. With the resulting slurry at 80° C. the calcium sulphate was filtered out, washed and dried. The calcium free solution was then weighed and analyzed and found to contain 223 pounds of nitrate nitrogen and 1187 pounds of potassium chloride was added. The solution was then evaporated to a concentration equivalent to a boiling point of 114° C. and cooled to 20° C. The resulting crystals were separated by a centrifugal filter and dried. There were 784 pounds of product containing 94.8% potassium nitrate and 2.94% ammonium chloride. The remaining filtrate was then evaporated to form mixed salts. A product containing 47.2% potassium nitrate and 52.8% ammonium chloride was obtained, this product amounting to 1835 pounds.

*Example II*

Approximately 1000 pounds of carbonized Florida rock containing 360 pounds phosphate and 500 pounds calcium oxide was dissolved in nitric acid by the counter-current leach procedure and the solution clarified. With the solution at 70° C., 205 pounds of potassium nitrate was added and the solution cooled to 30° C. A potassium silico fluoride precipitate weighing 55.1 pounds was removed by centrifugal filtering and was washed and dried. The filtrate from the fluoride removal was ammoniated to a pH of 1.75 and 221.8 pounds of calcium hydro-phosphate product was removed. After washing and drying this product was found to contain 40.8% phosphate and 30.05% calcium oxide. Of the phosphate of this product 30.1% was water soluble. The remaining filtrate was then ammoniated to a pH of 2.95 and 499 pounds of dicalcium phosphate product removed. After washing and drying this product was found to contain 50% phosphate and 40.67% calcium oxide with 0.25% fluorine. The filtrate was then further ammoniated to a pH of 6 and 30.8 pounds of pentacalcium phosphate product removed which, after washing and drying, was found to contain 48.75% phosphate and 48.1% calcium oxide. Of the foregoing phosphate cuts all were citrate soluble. The remaining filtrate was then further ammoniated to a pH of 7 and about a pound of tricalcium phosphate removed. This product after washing and drying contained 45.75% phosphate and 54.2% calcium oxide. This product was almost completely insoluble in water or ammonium citrate. The remaining filtrate was then weighed and analyzed for calcium oxide and found to contain 215 pounds. To this solution was added 376 pounds of sulfuric acid (77.67%) while adding ammonia to maintain the pH at 6. With the resulting slurry at a temperature of 80° C. the salcium sulphate was filtered out, washed and dried. The calcium free solution was weighed and analyzed to contain 223 pounds of nitrate nitrogen and 1187 pounds of potassium chloride was added. The treatment for the recovery of by-product salts set forth in Example I was repeated with similar results.

From the foregoing it will be apparent that the recovery of the phosphatic values is improved as compared with known sulfuric acid digestion procedures. The dicalcium phosphate obtained has an entirely satisfactory low fluorine content of a nature permitting complete use of the same in animal feeds. This product is found to be superior to that now being obtained utilizing the well known wet process phosphoric acid procedures. The color is better and the product is adequately anhydrous. No product more hygroscopic than ammonium chloride is formed in carrying out this method. Among other advantages the small amount of fluorine not precipitated as potassium silico fluoride may be recycled and recovered in subsequent batches of potassium silico fluoride. The greater portion of the phosphorous (about 65%) may be recovered as the calcium hydro-phosphate product which very closely resembles in all material respects the standard monocalcium phosphate which constitutes the most desirable calcium phosphate for fertilizer use. The "near" monocalcium phosphate product is highly water soluble which is of particular importance in fertilizer use. Furthermore, it is especially adapted for use as a purifier for sugar solutions.

A substantial part of the phosphorous is readily separated into a very pure anhydrous dicalcium phosphate, this material being presently considered the best for use in livestock feed since it is assimilated more efficiently than others. It is also the basic form of calcium phosphate used in the drug industry.

Pentacalcium phosphate which is completely available as a fertilizer is readily formed and separated from the other phosphates. The pentacalcium phosphate as mentioned above may also be brought down in the form of tricalcium phosphate depending upon the type of products desired. A large proportion of the nitrate nitrogen (about 30%) may be separated as the very desirable potassium nitrate. The readily separated ingredients may be recombined to form various fertilizer ratios if desired. With the method of the present invention a complete freedom of formulation is made possible. This is of particular importance in view of adequate and complete separation of the different types of phosphates.

Obviously certain modifications and variations of the invention as hereinbefore set forth may be made without departing from the spirit and scope thereof, and therefore only such limitations should be imposed as are indicated in the appended claims.

I claim:
1. In the method of recovering phosphatic values from phosphate rock wherein said rock is digested with an inorganic nitrogenous acid and the resulting acid solution is treated to substantially reduce the fluorine content thereof, the improvement comprising ammoniating the substantially fluorine-free acid solution to an extent that a calcium hydro-phosphate precipitate is formed, said calcium hydro-phosphate being less basic than true dicalcium phosphate, recovering the calcium hydro-phosphate precipitate formed, further ammoniating the acid solution to an extent that a dicalcium phosphate precipitate is formed, recovering the dicalcium precipitate formed, and thereafter treating the remaining solution to recover calcium and nitrogen values therefrom.

2. The method of recovering phosphatic values from phosphate rock which comprises digesting said rock with an inorganic nitrogenous acid, adding a potassium salt to the resultant acid solution in an amount which is sufficient to convert at least a substantial part of the fluorine content to an insoluble potassium silico fluoride, recovering the insoluble fluoride formed, ammoniating the acid solution to an extent that a calcium hydro-phosphate precipitate is formed, recovering the calcium hydro-phosphate precipitate formed, further ammoniating the acid solution to an extent that a dicalcium phosphate precipitate is formed, recovering the dicalcium phosphate precipitate formed, and thereafter treating the remaining solution to recover calcium and nitrogen values therefrom.

3. The method of recovering phosphatic values from phosphate rock which comprises digesting said rock with an inorganic nitrogenous acid, adding a potassium salt to the resultant acid solution in an amount which is sufficient to convert at least a substantial part of the fluorine content to an insoluble potassium silico fluoride, recovering the insoluble fluoride formed, ammoniating the acid solution to an extent that a calcium hydro-phosphate precipitate is formed, recovering the calcium hydro-phosphate precipitate formed, further ammoniating the acid solution to an extent that a dicalcium phosphate precipitate is formed, recovering the dicalcium phosphate precipitate formed, further ammoniating the acid solution to an extent that a tricalcium phosphate precipitate is formed, recovering the tricalcium phosphate precipitate formed, and thereafter treating the remaining solution to recover calcium and nitrogen values therefrom.

4. The method of recovering phosphatic values from phosphate rock which comprises digesting said rock with an inorganic nitrogenous acid, treating the resultant acid solution to substantially reduce the fluorine content thereof, ammoniating the acid solution to form an insoluble calcium-iron-phosphate-fluoride complex, recovering said complex, further ammoniating the acid solution to an extent that a dicalcium phosphate precipitate is formed, recovering the dicalcium phosphate precipitate formed, and treating the acid solution to recover calcium and nitrogen values therefrom.

5. The method of recovering phosphatic values from phosphate rock which comprises digesting said rock with an inorganic nitrogenous acid, adding potassium chloride to the resultant acid solution in an amount which is sufficient to convert at least a substantial part of the fluorine content to an insoluble potassium silico fluoride, recovering the insoluble fluoride formed, ammoniating the acid solution to form an insoluble calcium-iron-phosphate-fluoride complex, recovering said complex, further ammoniating the acid solution to an extent that a dicalcium phosphate precipitate is formed, recovering the dicalcium phosphate precipitate formed, and treating the acid solution to recover calcium and nitrogen values therefrom.

6. The method of recovering phosphatic values from phosphate rock which comprises digesting said rock with an inorganic nitrogenous acid, adding a potassium salt to the resultant acid solution in an amount which is sufficient to convert at least a substantial part of the fluorine content to an insoluble potassium silico fluoride, recovering the insoluble fluoride formed, ammoniating the acid solution to form an insoluble calcium-iron-phosphate-fluoride complex, recovering said complex, further ammoniating the acid solution to an extent that a calcium hydro-phosphate precipitate is formed, recovering the calcium hydro-phosphate precipitate formed, further ammoniating the acid solution to an extent that a dicalcium phosphate precipitate is formed, recovering the dicalcium phosphate preicpitate formed, and treating the acid solution to recover calcium and nitrogen values therefrom.

7. The method of recovering phosphatic values from phosphate rock which comprises digesting said rock with an inorganic nitrogenous acid, adding a potassium salt to the resultant acid solution in an amount which is sufficient to convert at least a substantial part of the fluorine content to an insoluble potassium silico fluoride, recovering the insoluble fluoride formed, ammoniating the acid solution to form an insoluble calcium-iron-phosphate-fluoride complex, recovering said complex, further ammoniating the acid solution to an extent that a dicalcium precipitate is formed, recovering the dicalcium precipitate formed, further ammoniating the acid solution to an extent that a tricalcium phosphate precipitate is formed, recovering the tricalcium phosphate precipitate formed, and thereafter treating the remaining solution to recover calcium and nitrogen values therefrom.

8. The method of recovering phosphatic values from phosphate rock which comprises digesting said rock with an inorganic nitrogenous acid, adding a potassium salt to the resultant acid solution in an amount which is sufficient to convert at least a substantial part of the fluorine content to an insoluble potassium silico fluoride, recovering the insoluble fluoride formed, ammoniating the acid solution to a pH of about 2, recovering a calcium hydro-phosphate precipitate formed, ammoniating the acid solution to a pH of about 3, recovering a dicalcium phosphate precipitate formed, ammoniating the acid solution to a pH of about 6, recovering a pentacalcium phosphate precipitate formed, ammoniating the acid solution to a pH of about 7, recovering a tricalcium phosphate precipitate formed, and thereafter treating the remaining solution to recover calcium and nitrogen values therefrom.

9. The method of claim 8 wherein the pentacalcium phosphate precipitate is recycled to the acid solution immediately prior to the first ammoniation step.

10. The method of recovering phosphatic values from phosphate rock which comprises digesting said rock with an inorganic nitrogenous acid, adding a potassium salt to the resultant acid solution in an amount which is sufficient to convert at least a substantial part of the fluorine content to an insoluble potassium silico fluoride, recovering the insoluble fluoride formed, ammoniating the acid solution to a pH of less than about 1 to form an insoluble calcium-iron-phosphate-fluoride complex, recovering said complex, ammoniating the acid solution to a pH of about 2, recovering a calcium hydro-phosphate precipitate formed, ammoniating the acid solution to a pH of about 3, recovering a dicalcium phosphate precipitate formed, ammoniating the acid solution to a pH of about 6, recovering a pentacalcium phosphate precipitate formed, ammoniating the acid solution to a pH of about 7, recovering a tricalcium phosphate precipitate formed, and thereafter treating the remaining solution to recover calcium and nitrogen values therefrom.

11. The method of recovering phosphatic values from phosphate rock which comprises digesting said rock with an inorganic nitrogenous acid, adding a potassium salt to the resultant acid solution in an amount which is sufficient to convert at least a substantial part of the fluorine content to an insoluble potassium silico fluoride, recovering the insoluble fluoride formed, ammoniating the acid solution to a pH of greater than 1 but less than about 3 to form a calcium hydro-phosphate precipitate, recovering the calcium hydro-phosphate precipitate formed, further ammoniating the acid solution to a pH of about 3, recovering a dicalcium phosphate precipitate formed, and thereafter treating the remaining solution to recover calcium and nitrogen values therefrom.

12. The method of recovering phosphatic values from phosphate rock which comprises digesting said rock with an inorganic nitrogenous acid, adding a potassium salt to the resultant acid solution in an amount which is sufficient to convert at least a substantial part of the fluorine content to an insoluble potassium silico fluoride, recovering the insoluble fluoride formed, ammoniating the acid solution to a pH of greater than 1 but less than about 3 to form a calcium hydro-phosphate precipitate, recovering the calcium hydro-phosphate precipitate formed, further ammoniating the acid solution to a pH of about 3, recovering a dicalcium phosphate precipitate formed, further ammoniating the acid solution to a pH of about 7, recovering a tricalcium phosphate precipitate formed, and thereafter treating the remaining solution to recover calcium and nitrogen values therefrom.

13. The method of recovering phosphatic values from phosphate rock which comprises digesting said rock with an inorganic nitrogenous acid, adding a potassium salt to the resultant acid solution in an amount which is sufficient to convert at least a substantial part of the fluorine content to an insoluble potassium silico fluoride, recovering the insoluble fluoride formed, ammoniating the acid solution to a pH of not greater than about 1 to form an insoluble calcium-iron-phosphate-fluoride complex, recovering said complex, further ammoniating the acid solution to a pH of greater than 1 to form a calcium hydro-phosphate precipitate, recovering the calcium hydro-phosphate precipitate formed, further ammoniating the acid solution to a pH of about 3, recovering a dicalcium phosphate precipitate formed, and thereafter treating the remaining solution to recover calcium and nitrogen values therefrom.

14. The method of recovering phosphatic values from phosphate rock which comprises digesting said rock with an inorganic nitrogenous acid, adding a potassium salt to the resultant acid solution in an amount which is sufficient to convert at least a substantial part of the fluorine content to an insoluble potassium silico fluoride, recovering the insoluble fluoride formed, ammoniating the acid solution to a pH of not greater than about 1 to form an insoluble calcium-iron-phosphate-fluoride complex, recovering said complex, further ammoniating the acid solution to a pH of greater than 1 to form a calcium hydro-phosphate precipitate, recovering the calcium hydro-phosphate formed, further ammoniating the acid solution to a pH of about 3, recovering a dicalcium phosphate precipitate formed, further ammoniating the acid solution to a pH of about 7, recovering a tricalcium phosphate precipitate formed, and thereafter treating the remaining solution to recover calcium and nitrogen values therefrom.

15. The method of recovering phosphatic values from phosphate rock which comprises the treatment steps of digesting said rock with an inorganic nitrogenous acid, adding a potassium salt to the resultant acid solution in an amount which is sufficient to convert at least a substantial part of the fluorine content to an insoluble potassium silico fluoride, recovering the insoluble fluoride formed, ammoniating the acid solution to a pH of not greater than about 1 to form an insoluble calcium-iron-phosphate-fluoride complex, recovering said complex and recycling same to the potassium chloride treatment step, further ammoniating the acid solution to a pH of greater than 1 to form a calcium hydro-phosphate precipitate, recovering the calcium hydro-phosphate precipitate formed, further ammoniating the acid solution to a pH of about 3, recovering a dicalcium phosphate precipitate formed, further ammoniating the acid solution to a pH of about 6, recovering a pentacalcium phosphate precipitate formed, further ammoniating the acid solution to a pH of about 7, recovering a tricalcium phosphate precipitate formed, and thereafter treating the remaining solution to recover calcium and nitrogen values therefrom.

16. The method of claim 15 wherein the pentacalcium phosphate precipitate is recycled to the acid solution immediately prior to the first ammoniation treatment step.

References Cited by the Examiner

UNITED STATES PATENTS

| | | | |
|---|---|---|---|
| 2,683,075 | 7/1954 | Caldwell | 71—39 |
| 2,689,175 | 9/1954 | Strelzoff et al. | 71—39 |
| 2,778,712 | 1/1957 | Caldwell | 71—39 |
| 2,942,967 | 6/1960 | Caldwell | 71—39 |
| 3,028,230 | 4/1962 | Brosheer | 71—39 |

DONALL H. SYLVESTER, *Primary Examiner.*

ANTHONY SCIAMANNA, *Examiner.*

T. KILEY, *Assistant Examiner.*